United States Patent [19]

Movshovitz

[11] Patent Number: 4,604,202

[45] Date of Patent: Aug. 5, 1986

[54] FILTER APPARATUS

[75] Inventor: Avner Movshovitz, Tel Aviv, Israel

[73] Assignee: Amcor Ltd., Tel Aviv, Israel

[21] Appl. No.: 686,379

[22] Filed: Dec. 26, 1984

[30] Foreign Application Priority Data

Mar. 27, 1984 [IL] Israel .................................. 71377

[51] Int. Cl.⁴ ........................ B01D 29/38; B01D 35/22
[52] U.S. Cl. ................................ 210/409; 210/433.1;
210/449; 210/460
[58] Field of Search ................ 137/549, 550; 210/247,
210/248, 312, 313, 409, 433.1, 449, 455, 460

[56] References Cited

U.S. PATENT DOCUMENTS

| 13,027 | 6/1855 | Clarke | 210/409 X |
|---|---|---|---|
| 153,406 | 7/1874 | Vaders | 210/409 X |
| 346,304 | 7/1886 | McLean et al. | 210/449 X |
| 375,798 | 1/1888 | Buchhorn | 210/449 |
| 548,338 | 10/1895 | Williams | 210/433.1 |
| 621,768 | 3/1899 | Hill | 210/433.1 X |
| 622,217 | 4/1899 | Fuller et al. | 210/409 X |
| 763,318 | 6/1904 | North | 210/409 X |
| 843,991 | 2/1907 | Bodge | 210/433.1 X |
| 948,311 | 2/1910 | Collin | 210/409 |
| 986,998 | 3/1911 | Kneen | 210/409 X |
| 1,046,285 | 12/1912 | Fischel | 210/460 X |
| 1,267,315 | 5/1918 | DeChime | 210/409 X |
| 1,653,473 | 12/1927 | Schulz | 210/409 X |
| 2,171,471 | 8/1939 | Brunetti | 210/433.1 X |
| 4,451,368 | 5/1984 | Pandelena et al. | 210/248 X |

FOREIGN PATENT DOCUMENTS

| 27935 | 2/1956 | Finland | 210/433.1 |
|---|---|---|---|
| 97952 | 5/1961 | Norway | 210/449 |
| 116725 | 3/1919 | United Kingdom | 210/433.1 |

Primary Examiner—Robert Spitzer
Attorney, Agent, or Firm—Browdy and Neimark

[57] ABSTRACT

Fluid filter apparatus including a body member defining a fluid inlet, a fluid outlet and a plurality of debris outlet apertures, a filter seated in the body member, and a cover member including a sleeve portion and an annular skirting mounted about the body member and arranged to assume a first orientation wherein the sleeve member is in sealing engagement with the debris outlet apertures and a second orientation wherein the annular skirting lies in adjacent non-sealing relationship with the debris outlet apertures whereby water and debris exiting therefrom impinge on the skirting for being deflected thereby.

7 Claims, 4 Drawing Figures

FILTER APPARATUS

FIELD OF THE INVENTION

The present invention relates to filter apparatus in general and, in particular, to cleanable water filter and flow rate control apparatus.

BACKGROUND OF THE INVENTION

The amount of water flowing out of a faucet or a shower head is difficult to control, particularly when one wishes to control the temperature thereof by adjusting the hot and cold water faucets. Thus, the volume of water used is often much greater than necessary, resulting in waste of water which may be expensive or scarce.

It is known to provide flow rate control apparatus to water outlets. Such apparatus may include, for instance, a flexible rubber member including a number of apertures through which all the water must pass. The application of increased pressure to the member, such as water pressure of the water flowing therethrough, causes the apertures to become smaller, thus permitting less water to pass therethrough.

One major disadvantage of these flow rate controllers is that dirt and other sediments from the water tend to settle on the member, clogging the apertures and causing the member to lose its resiliency. In order to solve this problem, it has been suggested to insert a filter upstream of the flow rate controller. However, conventional filters also tend to clog over time. Conventional water conducting elements in which these filters and flow rate controllers are mounted generally cannot be opened for cleaning, with the result that they must be disposed of once the filter is clogged, since they cannot be cleaned by backwashing. Those few elements which can be opened tend to eject the dirt in all directions upon opening, which makes cleaning them a messy and unpleasant task.

SUMMARY OF THE INVENTION

It is therefore an object of the present invention to provide a water or other fluid filter in an openable housing which overcomes the disadvantages of the prior art.

There is thus provided in accordance with the present invention fluid filter apparatus including a body member defining a fluid inlet, a fluid outlet and a plurality of debris outlet apertures, a filter seated in the body member, and a cover member including a sleeve portion and an annular skirting mounted about the body member and arranged to assume a first orientation wherein the sleeve member is in sealing engagement with the debris outlet apertures and a second orientation wherein the annular skirting lies in adjacent non-sealing relationship with the debris outlet apertures whereby water and debris exiting therefrom impinge on the skirting for being deflected thereby.

According to a preferred embodiment, the sleeve member is slideably mounted on the body member and is selectably slideable from the first orientation to the second orientation.

Further according to a preferred embodiment, the body member further comprises a stop member against which the sleeve member is seated in the first orientation.

Still further according to a preferred embodiment, the sleeve member further includes manual engagement means for manual displacement of the sleeve member from the first orientation to the second orientation.

Additionally in accordance with the present invention there is provided in line water flow rate control apparatus comprising a generally cylindrical body member defining a water inlet and a water outlet and a plurality of cleaning apertures therebetween, a flow rate control element mounted in the body member associated with the water outlet, filter means mounted in the body member upstream of the flow rate control element and adjacent the cleaning apertures, and a cover member displaceably mounted about the body member and defining a body engaging sleeve portion and a depending skirt portion, the cover member arranged to assume a first orientation wherein the body engaging portion sealingly engages the cleaning apertures and a second orientation wherein the cleaning apertures are unsealed adjacent the depending skirt portion.

BRIEF DESCRIPTION OF THE DRAWINGS

The apparatus of the present invention will be more fully understood from the following detailed description taken in conjunction with the drawings in which.

DETAILED DESCRIPTION OF THE INVENTION

Figure 1:
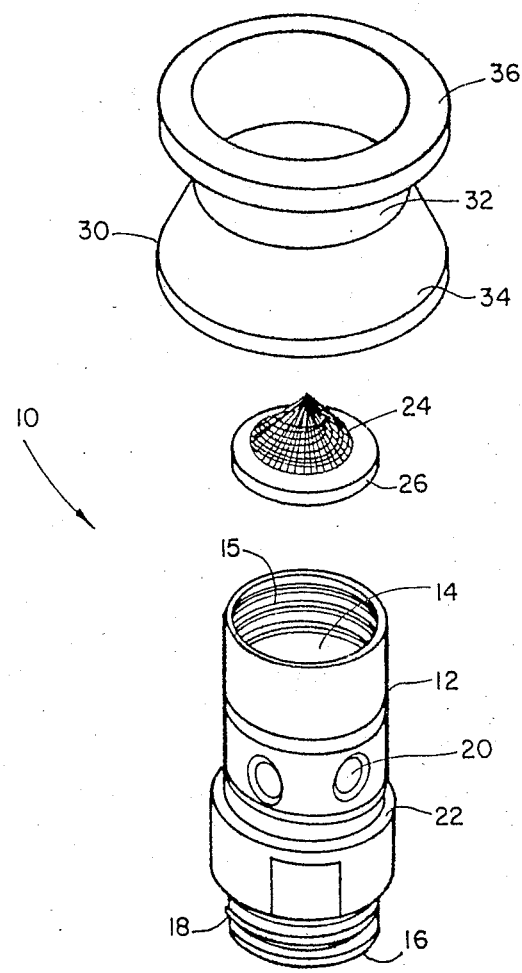
FIG. 1 is an exploded view of filter apparatus constructed and operative in accordance with an embodiment of the present invention.

With reference to FIG. 1 there is shown filter apparatus generally designated 10 constructed and operative in accordance with an embodiment of the present invention in exploded view. Filter apparatus 10 comprises a body 12 which is preferably generally cylindrical so as to be affixable in line to any water or fluid carrier. Body 12 defines a water inlet 14 which may define screw threading 15 on its interior surface for coupling to a water source, such as a shower inlet, and a water outlet 16, which may define screw threading 18 on its exterior surface for coupling as to a nozzle or other outlet element.

Body member 12 defines a plurality of apertures 20 about its circumference. Apertures 20 serve to permit the discharge of dirt, sediment and other debris removed from the water. According to the illustrated embodiment, the body member defines a plurality of tubular sections coupled by o-rings, the central section defining apertures 20. Preferably the body member also defines a protruding shoulder 22 or other stop member whose function will be discussed hereinbelow.

The filter apparatus also includes filter means, such as a conical filter 24 mounted within a seating rim 26. Filter 24 serves to filter out dirt and other debris from the water flowing therethrough. Preferably filter 24 is conical or defines other than a flat surface to permit entrapment of debris without clogging the filter. The filter means is seated within body 12 as on retaining ribs defined on the interior surface of the body. Filter 24 is seated in such a way that seating rim 26 is located downstream of apertures 20 whereby debris trapped on the upstream surface of filter 24 can be discharged via apertures 20.

Mounted about body member 12 is a cover member 30. Cover member 30 defines an elongate sleeve portion 32 and a depending skirting portion 34, and may also include a manually engageable handle portion 36. Cover member 30 is preferably slideably mounted onto body member 12 for slideable movement along the length thereof.

Sleeve portion 32 is designed such that its inner surface is complementary to the outer surface of the body member 12. The downstream edge of sleeve portion 32 is adapted for seating upon shoulder 22 of body member 12 when the cover member is in a first, closed orientation. In this orientation, sleeve portion 32 sealingly engages the portion of body member 12 defining apertures 20, preventing leakage via the apertures.

Downstream of sleeve portion 32 is a depending skirt portion 34 which extends outwardly at an angle relative to the body member. Skirt portion 34 encircles the body member and acts as a deflecting shield, as will be described below, whereby the debris discharged through apertures 20 is caught and deflected thereby, instead of flying in all directions. Skirt portion 34 is preferably of sufficient length to deflect substantially all the debris discharged through apertures 20 when the cover member is in a second, open orientation.

A manually engageable handle portion 36 may also be defined by the cover member 30. Handle portion 36, which defines a protruding ring in the illustrated embodiment, permits a person to grasp cover member 30 and to slide it along the length of the body member from its closed to its open orientation to permit cleaning of the filter.

Figure 2:
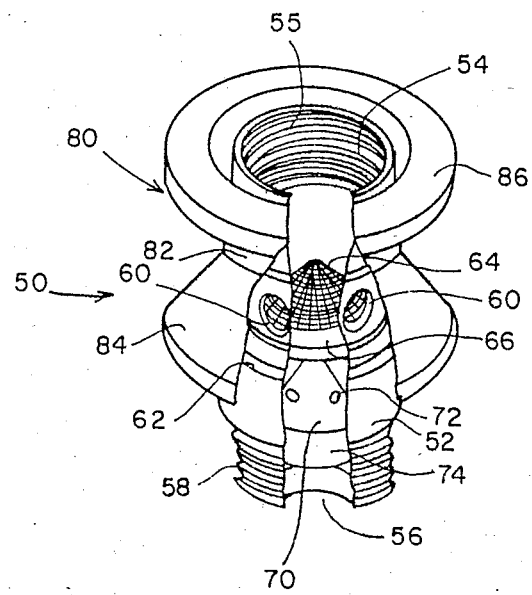
FIG. 2 is a partially cut away view of filter apparatus constructed and operative in accordance with an alternate embodiment of the present invention.

Referring to FIG. 2 there is shown a partially cut away illustration of filter apparatus generally designated 50 constructed and operative in accordance with an alternate embodiment of the present invention. Filter apparatus 50 comprises a body 52 which is preferably generally cylindrical so as to be affixable in line to any water or fluid carrier. Alternatively, body 52 may define any other cross section. Body 52 defines a water inlet 54 which may define screw threading 55 on its interior surface for coupling to a water source, such as a shower inlet, and a water outlet 56, which may define screw threading 58 on its exterior surface for coupling as to a nozzle or other outlet.

Body member 52 defines a plurality of apertures 60 about its circumference. Apertures 60 serve to permit the discharge of dirt, sediment and other debris removed from the water. According to the illustrated embodiment, the body member defines a plurality of tubular sections coupled by o-rings, the central section defining apertures 60. Preferably the body member also defines a protruding shoulder 62 or other annular protrusion whose function will be discussed hereinbelow.

The filter apparatus also includes filter means, such as a conical filter 64 mounted within a seating rim 66. Filter 64 serves to filter out dirt and other debris from the water flowing therethrough. Preferably filter 64 is conical or defines other than a flat surface to permit entrapment of debris without clogging the filter. The filter means is seated within body 52 as on retaining ribs defined on the interior surface of the body. Filter 64 is seated in such a way that seating rim 66 is located downstream of apertures 60 whereby debris trapped on the upstream surface of filter 64 can be discharged via apertures 60.

Also seated within body 52, preferably downstream of the filter means 64, is flow rate controlling means 70. Fluid flow controller 70 may comprise a conventional resilient or rubber element defining a plurality of apertures 72 whose sizes change according to changes in water pressure acting on the element. Flow rate controller 70 preferably defines a seating rim 74 which is adapted for seating within body 52 as upon ribs defined on the interior surface thereof. Flow rate controller 70 acts to govern the quantity of water flowing out of outlet 56 so as to prevent waste of water.

Mounted about body member 52 is a cover member 80. Cover member 80 defines an elongate sleeve portion 82 and a depending skirting portion 84, and may also include a manually engageable handle portion 86. Cover member 80 is preferably slideably mounted onto body member 52 for slideable movement along the length thereof.

Sleeve portion 82 is designed such that its inner surface is complementary to the outer surface of the body member 52. The downstream edge of sleeve portion 82 is adapted for seating upon shoulder 62 of body member 52 when the cover member is in a first, closed orientation. In this orientation, sleeve portion 82 sealingly engages the portion of body member 52 defining apertures 60, preventing leakage via the apertures.

Downstream of sleeve portion 82 is a depending skirt portion 84 which encircles the body member and preferably extends outwardly at an angle relative thereto. Skirt portion 84 is of sufficient length to deflect debris discharged through apertures 60 when the cover member is in a second, open orientation.

A manually engageable handle portion 86 may also be defined by the cover member 80. Handle portion 86, which defines a protruding ring in the illustrated embodiment, permits a person to grasp cover member 80 and to slide it along the length of the body member from its closed to its open orientation to permit cleaning of the filter.

Figure 3:
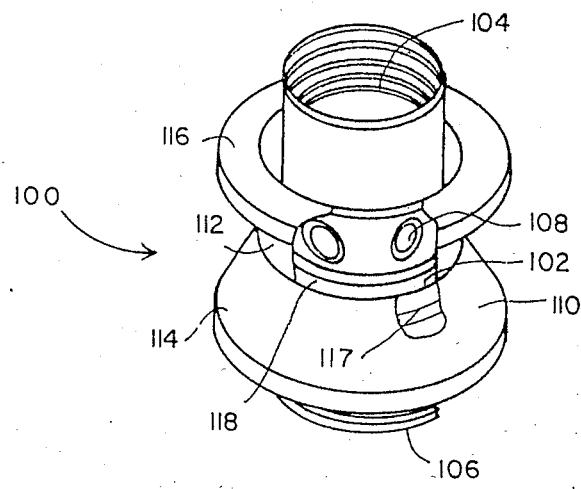
FIG. 3 is a partially cut away illustration of filter apparatus according to the present invention in a sealing orientation.

Operation of the apparatus of the present invention will now be described with reference to a preferred embodiment, illustrated in FIGS. 3 and 4. There is illustrated in FIG. 3, in a closed orientation for use, filter apparatus 100 comprising a body member 102 defining a fluid inlet 104, a fluid outlet 106 and a plurality of discharge apertures 108. Although body member 102 is illustrated as defining six apertures 108, any number of apertures, even one single aperture, is operative in the present invention.

Body member 102 is adapted to be inserted in any water or fluid line. According to one preferred embodiment, the apparatus is inserted onto a shower pipe, and the shower nozzle coupled to the outlet of the filter apparatus. However, it will be appreciated that the filter apparatus of the present invention can also be utilized in any other system in which it is desired to filter fluid flowing therethrough and to periodically clean the filters by means other than backflushing.

Filter means (not shown) are located within body 102, seated in such a way that any dirt or debris collected thereon lies adjacent discharge apertures 108. The apparatus further comprises a cover member 110. Cover member 110 defines an elongate sleeve portion 112, a depending skirt portion 114 and a handle portion 116.

In the closed orientation illustrated in FIG. 3, the filter is ready for use and water or other fluid can flow therethrough. The filter means is seated within the body member 102 and cover member 110 is seated as on a seating shoulder 117 defined by the body member downstream of apertures 108. In this orientation, sleeve portion 112 of cover member 110 surrounds in sealing engagement that portion of body member 102 defining apertures 108. The sealing engagement provided, in particular, between resilient o-rings 118 and the interior of sleeve portion 112 prevents leakage of fluid from apertures 108 and permit fluid flow only from the inlet 104 to the outlet 106.

Figure 4:
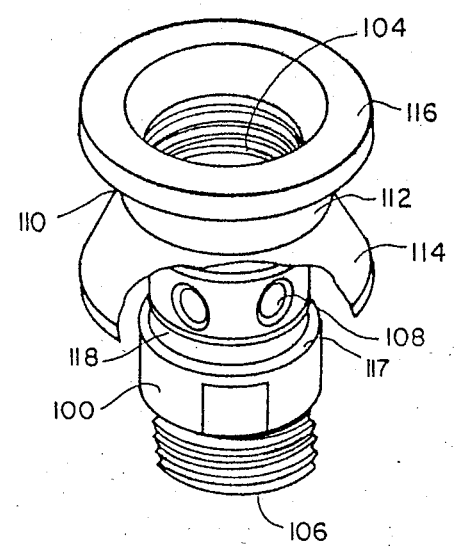
FIG. 4 is a partially cut away illustration of the filter apparatus of FIG. 3 in an open, cleaning orientation.

When it is desired to clean the filter apparatus, the cover member 110 is moved to a second, open orientation, illustrated in FIG. 4. In the illustrated embodiment, this is accomplished by sliding cover member 110 in an upstream direction along the length of the body member until sleeve portion 112 is entirely upstream of apertures 108. It will be appreciated that, in this orientation, apertures 108 are unsealed and water and accumulated debris can be discharged therethrough. Skirt portion 114 can be seen to encircle apertures 108 and serves to deflect the discharge from apertures 108 down the skirting so that it does not strike the person cleaning the filter apparatus. The skirting can be easily cleaned or permitted to drip dry.

Once the filter has been cleaned, the cover member 110 is moved back to the first, closed orientation of FIG. 3, and operation can commence again.

It will be appreciated that, although the cover member is illustrated as being slideable from the first, closed orientation to the second, open orientation, any other means of causing the sleeve portion to sealingly engage the discharge apertures during use and causing the skirt portion to encircle the apertures during cleaning may alternately be employed.

It will further be appreciated by those skilled in the art that the invention is not limited to what has been shown and described hereinabove merely by way of example. Rather, the scope of the invention is limited solely by the claims which follow.

I claim:

1. Fluid filter apparatus which can be flushed in a controlled manner by a single longitudinal manual manipulation comprising:

a body member defining a fluid inlet and a fluid outlet which are separated along a longitudinal axis, the fluid outlet providing a fluid discharge along said longitudinal axis, and at least one flushing aperture disposed intermediate said fluid inlet and said fluid outlet;

filter means seated within said body member and disposed such that an upstream filter surface thereof lies adjacent and in communication with said at least one flushing aperture;

a manually adjustable flushing control cover member slidably mounted on said body member and arranged to have first and second operative orientations with respect thereto which are separated from each other along said longitudinal axis, and comprising a sleeve portion adapted for selectable sealing engagement with said at least one flushing aperture when said cover member is in a first operative orientation and a depending skirt portion arranged with respect to said sleeve portion such that when said cover member is in said second operative orientation and said sleeve portion lies above said at least one flushing aperture and out of sealing engagement therewith, fluid exiting from said at least one flushing aperture engages said skirt portion and is restricted to flow in a direction along said longitudinal axis;

said cover member being arranged to assume either said first orientation wherein said sleeve portion sealingly engages said at least one aperture, preventing fluid outflow therethrough, or said second orientation wherein said skirt portion lies in adjacent non-sealing relationship with said at least one aperture whereby substantially all fluid discharge from said aperture impinges on said skirt portion for being deflected thereby, such that at no position of said cover member relative to said body member, if fluid discharge from said fluid filter apparatus permitted other than along said longitudinal axis; and manual engagement means for manual displacement of said cover member from said first orientation to said second orientation.

2. Apparatus according to claim 1 and further comprising flow rate controlling means seated within said body member.

3. Apparatus according to claim 1 and wherein said body member further comprises a stop member against which the sleeve portion is seated in the first orientation.

4. Apparatus according to claim 1 and wherein said at least one aperture comprises a plurality of apertures.

5. In line water flow rate control apparatus comprising:

a generally cylindrical body member defining a water inlet and a water outlet which are separated along a longitudinal axis, the fluid outlet providing a water output along said longitudinal axis, and at least one flushing aperture disposed intermediate said water inlet and said water outlet;

flow rate control means mounted in said body member and associated with the water outlet;

filter means mounted in the body member and disposed such that an upstream filter surface thereof lies adjacent and in communication with said at least one flushing aperture; and a manually adjustable flushing control cover member slidably mounted on said body member and arranged to have first and second operative orientations with respect thereto which are separated from each other along said longitudinal axis, and comprising a sleeve portion adapted for selectable sealing engagement with said at least one flushing aperture when said cover member is in a first operative orientation and a depending skirt portion arranged with respect to said sleeve portion such that when said cover member is in said second operative orientation and said sleeve portion lies above said at least one flushing aperture and out of sealing engagement therewith, water exiting from said at least one flushing aperture engages said skirt portion and is restricted to flow in a direction along said longitudinal axis;

said cover member being arranged to assume either said first orientation wherein said sleeve portion sealingly engages said at least one aperture, preventing water outflow therethrough, or said second orientation wherein said skirt portion lies in adjacent non-sealing relationship with said at least one aperture whereby substantially all water discharge from said aperture impinges on said skirt portion for being deflected thereby, such that at no position of said cover member relative to said body member, is water discharge from said water filter apparatus permitted other than along said longitudinal axis; and manual engagement means for manual displacement of said cover member from said first orientation to said second orientation.

6. Apparatus according to claim 5 and wherein said body member further comprises a stop member against which the sleeve portion is seated in the first orientation.

7. Apparatus according to claim 5 and wherein said at least one aperture comprises a plurality of apertures.

* * * * *